(12) United States Patent
Skowronek et al.

(10) Patent No.: US 8,537,016 B2
(45) Date of Patent: Sep. 17, 2013

(54) DEVICES AND METHODS FOR PROTECTING A PACKAGED RADIO FREQUENCY IDENTIFICATION DEVICE FROM ELECTRONIC READING

(75) Inventors: Daniel P. Skowronek, Parker, CO (US); Matthew L. Withey, Highlands Ranch, CO (US)

(73) Assignee: First Data Corporation, Greenwood Village, CO (US)

( * ) Notice: Subject to any disclaimer, the term of this patent is extended or adjusted under 35 U.S.C. 154(b) by 1002 days.

(21) Appl. No.: 12/258,985

(22) Filed: Oct. 27, 2008

(65) Prior Publication Data
US 2010/0102966 A1    Apr. 29, 2010

(51) Int. Cl.
*G08B 13/14* (2006.01)
*H04Q 5/22* (2006.01)
*G06K 19/00* (2006.01)
*G06K 19/06* (2006.01)

(52) U.S. Cl.
USPC ............... 340/572.8; 340/572.1; 340/10.1; 235/487; 235/492

(58) Field of Classification Search
None
See application file for complete search history.

(56) References Cited

U.S. PATENT DOCUMENTS

| | | | | |
|---|---|---|---|---|
| 4,429,015 | A * | 1/1984 | Sheptak | 428/201 |
| 4,749,124 | A * | 6/1988 | Bazan | 229/92.8 |
| 5,405,197 | A * | 4/1995 | Makowka | 383/5 |
| 6,164,548 | A * | 12/2000 | Curiel | 235/487 |
| 6,447,015 | B1 * | 9/2002 | Linnewiel | 283/81 |
| 6,715,797 | B2 * | 4/2004 | Curiel | 283/67 |
| 7,578,048 | B2 * | 8/2009 | Wollach et al. | 29/600 |
| 7,712,675 | B2 * | 5/2010 | Balinsky et al. | 235/492 |
| 2002/0135481 | A1 | 9/2002 | Conwell et al. | |
| 2003/0218328 | A1 * | 11/2003 | Conwell | 281/31 |
| 2005/0011776 | A1 * | 1/2005 | Nagel | 206/39 |
| 2005/0035590 | A1 * | 2/2005 | Jones et al. | 283/74 |
| 2006/0044206 | A1 * | 3/2006 | Moskowitz et al. | 343/841 |
| 2006/0118639 | A1 | 6/2006 | Kean et al. | |

(Continued)

FOREIGN PATENT DOCUMENTS

| | | |
|---|---|---|
| EP | 1587047 | 10/2005 |
| EP | 1587047 A1 | 10/2005 |
| JP | 11045316 | 2/1999 |
| JP | 11045316 A | 2/1999 |

OTHER PUBLICATIONS

International Search Report and Written Opinion for PCT/US2009/062170, mailed May 12, 2011, European Patent Office.

(Continued)

*Primary Examiner* — Julie Lieu
(74) *Attorney, Agent, or Firm* — Sutherland Asbill & Brennan LLP (57) ABSTRACT

Devices and methods for protecting a radio frequency identification (RFID) device from electronic reading prior to the sale of the RFID device where a package includes an upper layer comprising a radio frequency shielding material covering at least the upper and side portions of an RFID device. The package also includes a lower layer covering the lower portion of the RFID device, where the lower layer is connected to the upper layer. The package also includes a tamper indicator that provides a physical indication of when the package has been at least partially opened or damaged. The package may be composed of plastic sheeting incorporated with radio frequency shielding material, such as a ferrous material, and in some embodiments may include a plastic film envelope incorporated with radio frequency shielding material encasing the RFID device.

22 Claims, 6 Drawing Sheets

(56) References Cited

U.S. PATENT DOCUMENTS

| | | | |
|---|---|---|---|
| 2006/0187055 A1* | 8/2006 | Colby | 340/572.7 |
| 2006/0246984 A1* | 11/2006 | Walker et al. | 463/16 |
| 2006/0273176 A1* | 12/2006 | Audebert et al. | 235/451 |
| 2007/0205953 A1* | 9/2007 | Bombay et al. | 343/841 |
| 2008/0186186 A1* | 8/2008 | Campbell | 340/572.8 |
| 2008/0257966 A1 | 10/2008 | Britt et al. | |
| 2009/0001150 A1* | 1/2009 | Care | 229/301 |
| 2009/0026751 A1* | 1/2009 | Rancien et al. | 281/29 |
| 2009/0260731 A1* | 10/2009 | Roth et al. | 150/147 |
| 2009/0315320 A1* | 12/2009 | Finn | 283/107 |
| 2010/0026468 A1* | 2/2010 | Nyalamadugu et al. | 340/10.51 |
| 2010/0147724 A1* | 6/2010 | Mitra-Shah et al. | 206/459.1 |
| 2010/0263179 A1* | 10/2010 | Boldin | 28/100 |
| 2010/0289627 A1* | 11/2010 | McAllister et al. | 340/10.42 |
| 2010/0308965 A1* | 12/2010 | Weitzhandler et al. | 340/10.1 |

OTHER PUBLICATIONS http://www.idstronghold.com, Author Unknown. Printed Sep. 23, 2008, date of publication unknown (2 pages).

International Search Report and Written Opinion for PCT/US2009/062170, mailed Feb. 5, 2010, European Patent Office.

* cited by examiner

DEVICES AND METHODS FOR PROTECTING A PACKAGED RADIO FREQUENCY IDENTIFICATION DEVICE FROM ELECTRONIC READING

FIELD OF THE INVENTION

Embodiments of the invention relate generally to the packaging of electronic devices, and more particularly to devices and methods for packaging items containing radio frequency identification (RFID) technology.

BACKGROUND OF THE INVENTION

Transaction cards, such as credit cards, debit cards, ATM cards, bank cards, loyalty cards, gift cards, stored valued cards, etc. are increasingly replacing other types of tender in consumer transactions. Additionally, various transaction cards may also be used for gaining access to buildings, systems, or to provide other authentication schemes. Recently there has been a movement toward contactless transaction cards containing an RFID device or similar technology that initiate a transaction with a quick wave of a card before a radio frequency enabled or other wireless enabled terminal reader. For instance, RFID developers and manufacturers may provide products incorporating RFID-enabled chips that may be externally attached to, or incorporated into, any personal item of a user, for example, a key chain, a personal music player, a pass card, a personal digital assistant (PDA), or a mobile phone. Moreover, many loyalty card, gift card, and stored value card issuers, and many major credit card companies now offer contactless transaction devices, and many merchants have installed radio frequency enabled readers to facilitate such contactless electronic transactions.

Because some contactless transaction devices such as prepaid or stored value contactless cards serve as bearer instruments without requiring additional authentication of the user, it becomes easier to use another's card without their permission to exploit the stored or accessible information or to conduct unauthorized transactions. The incidents of fraud, information theft, identity theft, online fraud, etc. are increasing as consumers more commonly rely on these contactless transaction devices.

Indeed, fraud and abuse may occur even before the contactless transaction devices, such as contactless transaction cards, have been placed into service. Many identity thieves, hackers, and others seeking to commit fraud often use devices that employ analog electronic circuits that can detect the presence of an RFID device operating at a particular frequency. These detection devices, commonly referred to as "sniffers", may be able to interrogate and record the identification information stored in RFID devices for use in fraudulent transaction. For instance, an RFID device may be "sniffed" prior to activation by a customer or prior to the sale of an RFID device by a merchant without the customer or merchant knowing that the identification information has been compromised. Once the RFID device is activated, the sniffed identification information can be used to make fraudulent transactions with the identification information of the RFID device without the knowledge of the customer until after the fraudulent transaction has occurred. What is needed is a way to secure the RFID devices at least up to the point of sale of the RFID device and/or activation of the RFID device by the merchant or customer.

SUMMARY OF THE INVENTION

According to an embodiment of the invention, there is disclosed a package for an RFID device that includes an upper layer comprising a radio frequency shielding material, where the upper layer covers upper and side portions of a radio frequency identification device. The package further includes a lower layer covering the lower portion of the radio frequency device, where the lower layer is connected to the upper layer with a tamper indicator.

In accordance with one aspect of the invention, the RFID device is visible through the upper layer of the package. According to another aspect of the invention, the radio frequency shielding material is an iron oxide coating. In accordance with yet another aspect of the invention, the radio frequency shielding material is embedded into the upper layer in sufficient quantity to provide Radio Frequency (RF) shielding. According to another aspect of the invention, the package further includes at least one tab connected to at least the upper layer, where manipulation (e.g., pulling, pushing, squeezing, tearing, etc.) of the tab activates the tamper indicator. In accordance with yet another aspect of the invention, the lower layer includes an embedded radio frequency shielding material.

According to another aspect of the invention, the radio frequency shielding material is at least partially comprised of iron, copper, nickel, or other materials that provide radio frequency shielding. In accordance with yet another aspect of the invention, the tamper indicator includes a plastic film containing fiber strands that are misaligned when a portion of the tamper indicator is broken. According to another aspect of the invention, the tamper indicator includes an adhesive that changes color when the tamper indicator is broken. In accordance with yet another aspect of the invention, the tamper indicator damages a portion of the upper layer or lower layer when the tamper indicator is broken. According to another aspect of the invention, the tamper indicator includes an adhesive that diminishes its adhesive properties when the tamper indicator is broken. In accordance with yet another aspect of the invention, the upper layer comprises a two-layer film, where the first layer of the two-layer film includes the radio frequency shielding material, the second layer of the two-layer film second layer includes the tamper indicator, and the first layer and second layer of the two-layer film are bonded together.

In accordance with another embodiment of the invention, there is disclosed a package for holding an RFID device that includes a plastic film envelope, where the envelope comprises a radio frequency shielding material, and the envelope can be sealed to encase an RFID device when the RFID device is inserted within the envelope. The package further includes a tamper indicator incorporated into a seal of the envelope, where the tamper indicator is activated when the seal is at least partially broken.

According to one aspect of the invention, the package further includes at least one lab connected to at least the envelope, where manipulation (e.g., pulling, pushing, squeezing, tearing, etc.) of the lab activates the tamper indicator. In accordance with another aspect of the invention, the radio frequency shielding material is embedded into the envelope in sufficient quantity to provide RF shielding. According to yet another aspect of the invention, the tamper indicator is plastic film containing fiber strands that are misaligned when the at least a portion of the seal of the envelope is broken. In accordance with another aspect of the invention, the envelope is connected to the lower layer or upper layer by an adhesive. According to yet another aspect of the invention, the tamper indicator includes an adhesive that changes color when at least a portion of the seal of the envelope is broken. In accordance with another aspect of the invention, the package further comprises an upper layer and a lower layer, where the lower layer is connected to the upper layer such that the plastic film envelope is encased by the upper layer and lower layer. According to yet another aspect of the invention, the radio frequency shielding material is embedded into the upper layer in sufficient quantity to provide RF shielding.

According to yet another embodiment of the invention, there is disclosed a method of manufacturing packaging for an RFID device, where the method includes providing an upper layer comprising a radio frequency shielding material, where the upper layer covers upper and side portions of an RFID device. The method further includes providing a lower layer covering the lower portion of the RFID device, where the lower layer is connected to the upper layer with a tamper indicator. In accordance with one aspect of the invention, the radio frequency shielding material is embedded into the upper layer in sufficient quantity to provide RF shielding. According to yet another aspect of the invention, the upper layer provided comprises a two-layer film, where the first layer of the two-layer film includes the radio frequency shielding material, the second layer of the two-layer film second layer includes the tamper indicator, and the first layer and second layer of the two-layer film are bonded together.

In accordance with another embodiment of the invention, there is disclosed an article that includes an RFID device and a package for the RFID device. The package included in the article includes an upper layer incorporating a radio frequency shielding material covering the upper and side portions of the RFID device, and a lower layer covering a lower portion of the RFID device, where the lower layer is connected to the upper layer with a tamper indicator.

DETAILED DESCRIPTION OF EMBODIMENTS OF THE INVENTION

Embodiments of the invention are directed to providing packaging for protecting an RFID device from electronic reading prior to the sale of the RFID device. Embodiments of the invention combine radio frequency shielding material with tamper evident technology when creating packaging for an RFID device (e.g., an RFID tag). For instance, in one embodiment of the invention, a package for the RFID device includes an upper layer incorporated (e.g., sprayed, coated, deposited, embedded, etc.) with a radio frequency shielding material operable to provide RF shielding for the RFID device, such as, for example, a ferrous material, covering at least the upper and side portions of an RFID device. The package also includes a lower layer covering the lower portion of the RFID device, where the lower layer is connected to the upper layer so as to encase the RFID device. The package also includes a tamper indicator that provides a physical indication of when the package has been at least partially opened or damaged.

The packaging and methods for creating the packaging described herein may provide several advantages including protecting RFID devices from being read electronically while they are in a store waiting to be purchased and/or activated. The packaging also provides visual assurance to consumers and merchants that the RFID device electronic information has not been copied or stolen prior to sale and activation of the RFID device. The packaging also provides a consumer friendly packaging for removing and accessing the RFID device while also allowing for manufacturers and distributors to create and/or provide a relatively simple, cost effective, package for RFID devices.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention are described below with reference to block diagrams and flowchart illustrations of systems, methods, apparatuses and computer program products. It will be understood that each block of the block diagrams and flowchart illustrations, and combinations of blocks in the block diagrams and flowchart illustrations, respectively, can be implemented manually and/or by computer program instructions.

Figure 1:
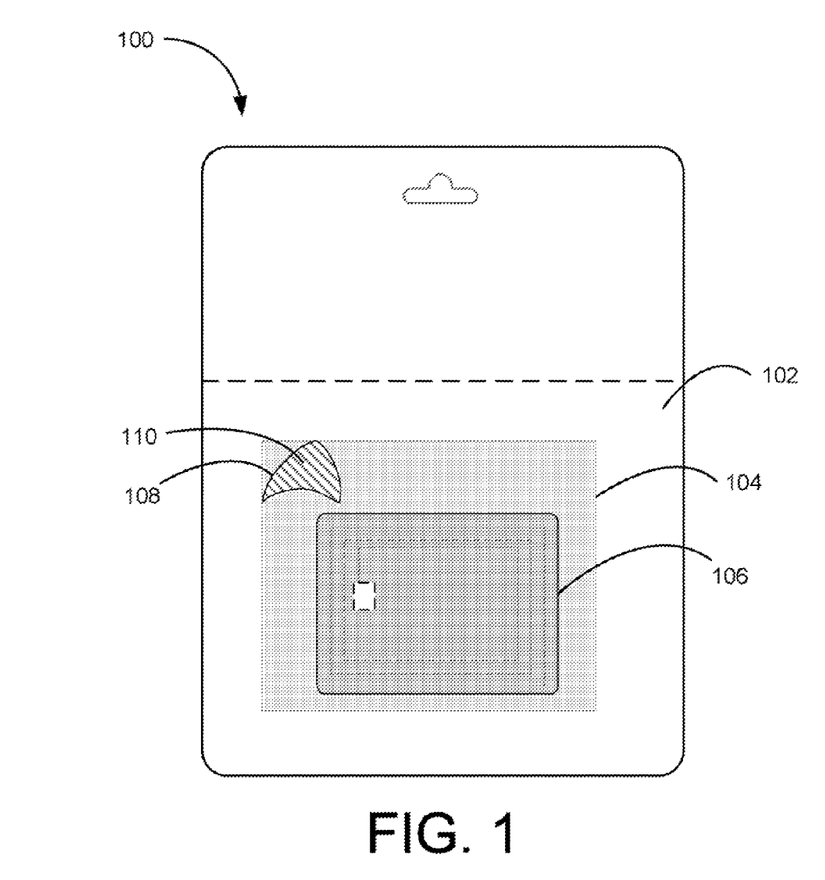
FIG. 1 illustrates a package for an RFID device in accordance with one embodiment of the invention.

FIG. 1 illustrates a display package 100 for an RFID device in accordance with one embodiment of the invention. As shown in FIG. 1, display package 100 includes a lower layer 102, an upper layer 104, an RFID device 106, and a tab 108. In embodiments of the invention, the lower layer 102 of the package 100 may be a sheet of cardboard or sheet of plastic or other material appreciable by of ordinary skill in the art. In an alternative embodiment of the invention, additional layers may be used to create a display package. For instance, the lower layer 102 may be a plastic sheet on top of a sheet of cardboard.

As shown in the embodiment of FIG. 1, the RFID device 106 is placed on top of the lower layer 102. In embodiments of the invention, the RFID device 106 may either be attached with adhesive or free floating. The upper layer 104 is a covering of the RFID device 106 that connects to the lower layer 102 thereby encasing the RFID device 106. The upper layer 104 may be connected to the lower layer by an adhesive, stitching or other means appreciable by one of ordinary skill in the art. In embodiments of the invention, the upper layer 104 may have a radio frequency shielding material operable to provide RF shielding for the RFID device 106, such as, for example, a ferrous material, incorporated with the upper layer 104. In an embodiment of the invention, the radio frequency shielding material is in sufficient quantity so to provide shielding for the RFID device 106 from being "sniffed" by an external device while the RFID device 106 is encased in the display package 100. In embodiments of the invention, the radio frequency shielding material may be sprayed, coated, deposited, and/or embedded into the material that makes up the upper layer 104, or the radio frequency shielding material may be an iron oxide coating that substantially covers the upper layer 104. Other radio frequency shielding materials may be used to provide radio frequency shielding for the RFID device in alternative embodiments of the invention including electromagnetic shielding materials such as for example, those materials containing copper, nickel, etc. The size, thickness, quantity, and form of the radio frequency shielding material may be tailored to the amount of radio frequency shielding that is sufficient to protect the RFID devices 106 from "sniffer" devices while in the package.

In one embodiment of the invention, the upper layer 104 may be sprayed, coated, deposited, and/or embedded with radio frequency shielding material, such as, for example, ferrous materials, in sufficient quantity to provide RF shielding while also being transparent or translucent enough to allow the encased RFID device 106 to be at least partially visible through the upper layer 104. In some embodiments of the invention only the upper layer 104 contains the radio frequency shielding material for RF shielding as long as the RFID device 106 has sufficient shielding from the backing of the RFID device 106. In those embodiments where the RFID device 106 has sufficient RF shielding from one side of the device (e.g., the back portion), then the radio frequency shielding material need only be in the upper layer 104 covering those sides of the RF device that do not have sufficient RF shielding. In other words, the RFID does not need to be fully encased in the design package 100. In an alternative embodiment of the invention, the lower layer 102 may also be incorporated with radio frequency shielding material to provide RF shielding similar to the various ways it is incorporated into the upper layer described above. Additional layers providing radio frequency shielding material and/or physical structure or support to the package may also be used in alternative embodiments of the invention.

In some embodiments of the invention, such as the embodiment shown in FIG. 1, the upper layer 104 also incorporates a tamper indicator 110. In one embodiment of the invention, the upper layer 104 may be made by tamper evident plastic film. Other tamper evident technology appreciable by one of ordinary skill in the art may also be used. Other tamper indicators 110 that may be used in alternative embodiments of the invention, may include (1) an adhesive that diminishes its adhesive properties if separated and exposed to air or light thereby only allowing for one-time-use, (2) an adhesive or other connection means that are strong enough to require destruction of at least a portion of the lower layer 102 and/or the upper layer 104 to open, (3) an indicator, adhesive, or other materials that change the color of at least a portion of the lower layer 102 and/or the upper layer 104 when the connection seal has been compromised, or (4) fibers that may be embedded in the lower layer 102 and/or the upper layer 104 in a pattern before attaching with adhesive such that attempts to open and re-close the display package 100 are visible because the strand orientation is disoriented. In other embodiments of the invention the upper layer 104 may be comprised of a two-layer film, where the first layer of the two-layer film includes the radio frequency shielding material and where the second layer of the two-layer film second layer includes the tamper indicator. In such embodiments of the invention, the first layer and second layer of the two-layer film may be bonded together chemically either through heating the two layers or use of an adhesive.

In alternative embodiments of the invention, the lower layer 102 may also be incorporated with tamper indicating technology similar to the various ways it is incorporated into the upper layer 104 described above. Additionally, other embodiments may have the tamper indicator 110 be the connection between the lower layer 102 and the upper layer 104 and/or incorporate tamper indicating technology at the point of connection between the lower layer 102 and the upper layer 104. For example, the lower layer 102 and the upper layer 104 may be connected using an adhesive that is one good for one use and once separated cannot be used to reconnect the lower layer 102 and upper layer 104. Alternatively, the connection between the upper layer and the lower layer may provide for a change in color to either the lower layer 102 or upper layer 104 once the connection is broken, or require destruction of at least a portion of the lower layer 102 or upper layer 104 once opened. Other means for tamper evident technology appreciable by one of ordinary skill in the art may also be incorporated into the display package 100.

As shown in FIG. 1, tab(s) 108 may be incorporated into the display package 100 to make it easy for the consumer to remove the upper layer of film once they have purchased and/or activated the RFID device 106. In an embodiment of the invention, the tab(s) 108 may be incorporated into the upper layer 104 as a point for the purchaser to easily open the package through manipulation of the tab(s) 108 (e.g., pulling, pushing, squeezing, tearing, etc.). In embodiments of the invention using tab(s) 108, the use of a tab 108 may be a tamper indicator 110 in that once the tab 108 has been used the integrity of the display package is compromised and at least a portion of the display package is permanently destroyed. In some embodiments of the invention, the lower layer 102 and/or the upper layer 104 may incorporate logos, information pertaining to the radio frequency shielding or tamper resistant technology incorporated into the package, and/or instructions or advertisements for the RFID device 106.

Figure 2:
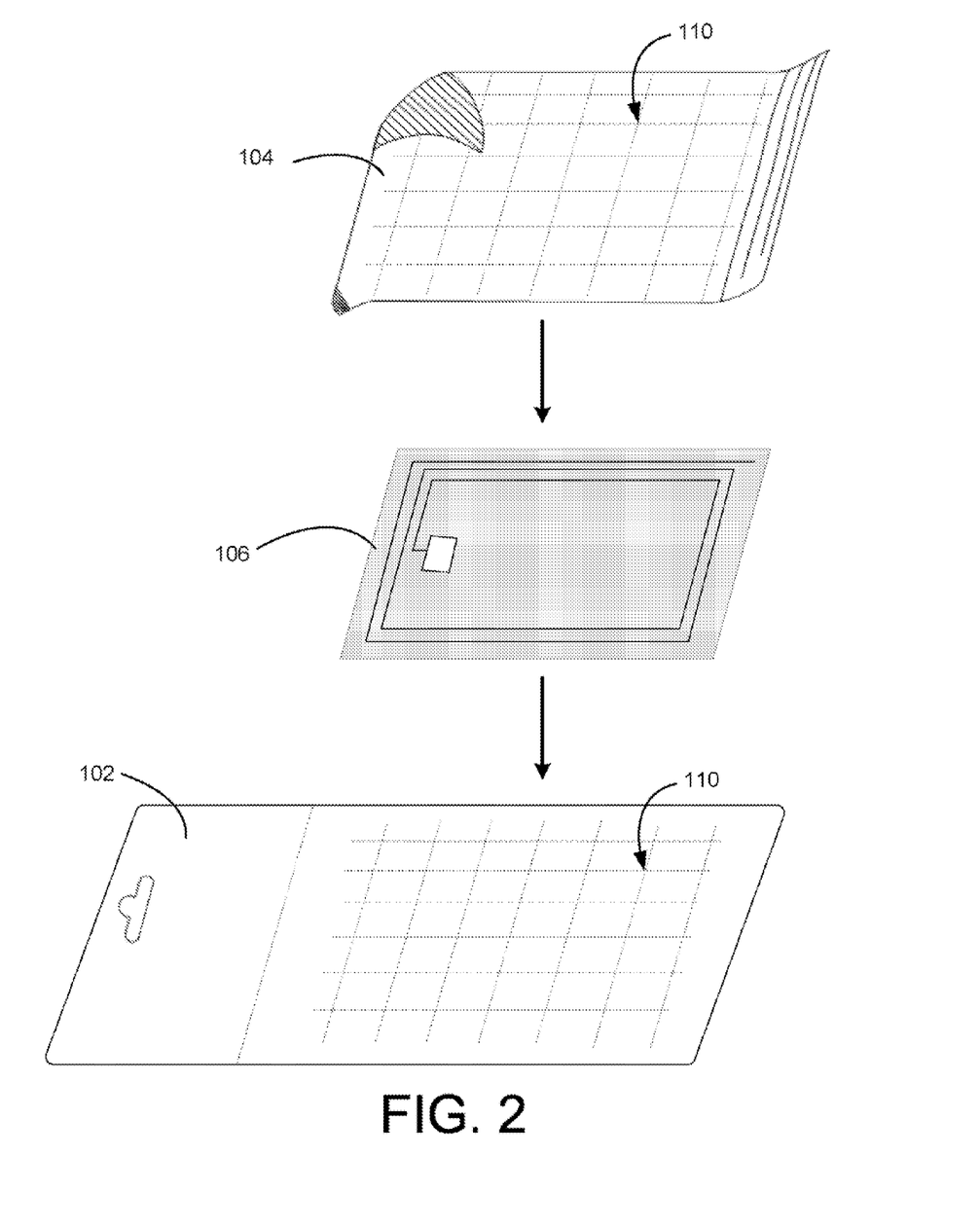
FIG. 2 illustrates an exploded view of a package for an RFID device in accordance with one embodiment of the invention.

FIG. 2 illustrates an exploded view of a display package for an RFID device in accordance with one embodiment of the invention. As shown in FIG. 2, the RFID device 106 is placed on top of the lower layer 102, and the upper layer 104 covers the RFID device 106. Also shown in FIG. 2 is a tamper indicator 110 incorporated into the upper layer 104 and lower layer 102 in the form of a grids of fiber strands. In the embodiment of FIG. 2, when the display package is created the two grids officer strands will match up. However, if the package has been significantly deformed or at least partially opened then the two grids will not match up thereby providing a visual indication of tampering or an attempted opening of the display package. While the grid layouts are shown in the embodiment of FIG. 2 as a tamper indicator 110, other tamper indicators 110 described with reference to FIG. 1 as well as other tamper evident technology appreciable by one of ordinary skill in the art may be utilized in other embodiments.

Figure 3:
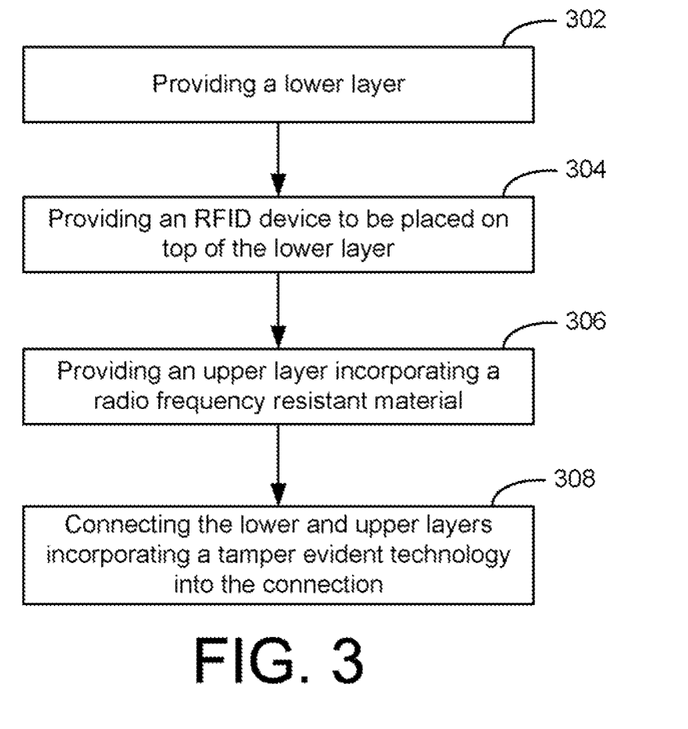
FIG. 3 illustrates a flowchart of a method for making a package for an RFID device in accordance with one embodiment of the invention.

FIG. 3 illustrates a flowchart of a method for making a display package for an RFID device in accordance with one embodiment of the invention. The process of making the display package for an RFID device begins with block 302 by providing a lower layer. In embodiments of the invention, the lower layer may be a sheet of cardboard, plastic or another material appreciable by one of ordinary skill in the art. In alternative embodiments of the invention, the lower layer may incorporate a radio frequency shielding material, such as, for example, a ferrous material, in such quantities so as to provide RF shielding for the RFID device. Next, block 304 is invoked where an RFID device is placed on top of the lower layer. In embodiments of the invention, the RFID device may be free floating or connected to the lower layer by an adhesive or other connection means appreciable to one of ordinary skill in the art. Next, block 306 is invoked where an upper layer is provided. In embodiments of the invention the upper layer may incorporate a radio frequency shielding material, such as, for example, a ferrous material, in such quantities so as to provide RF shielding for the RFID device.

Finally, block 308 is invoked connecting the lower layer and upper layer. In some embodiments of the invention the lower layer and the upper layer are connected in such a way so as to encase the RFID device. In embodiments of the invention, the connection may serve as a tamper indicator or otherwise incorporate tamper evident technology. In some embodiments of the invention, tamper indicators may include (1) an adhesive that diminishes its adhesive properties if separated and exposed to air or light thereby only allowing for one-time-use, (2) an adhesive or other connection means that are strong enough to require destruction of at least a portion of the lower layer 102 and/or the upper layer 104 to open. (3) an indicator, adhesive, or other materials that change the color of at least a portion of the lower layer 102 and/or the upper layer 104 when the connection seal has been compromised, or (4) fibers that may be embedded in the lower layer 102 and/or the upper layer 104 in a pattern before attaching with adhesive such that attempts to open and re-close the display package 100 are visible because the strand orientation is disoriented. Other tamper evident technology appreciable by one of ordinary skill in the art may also be used.

Figure 4A:
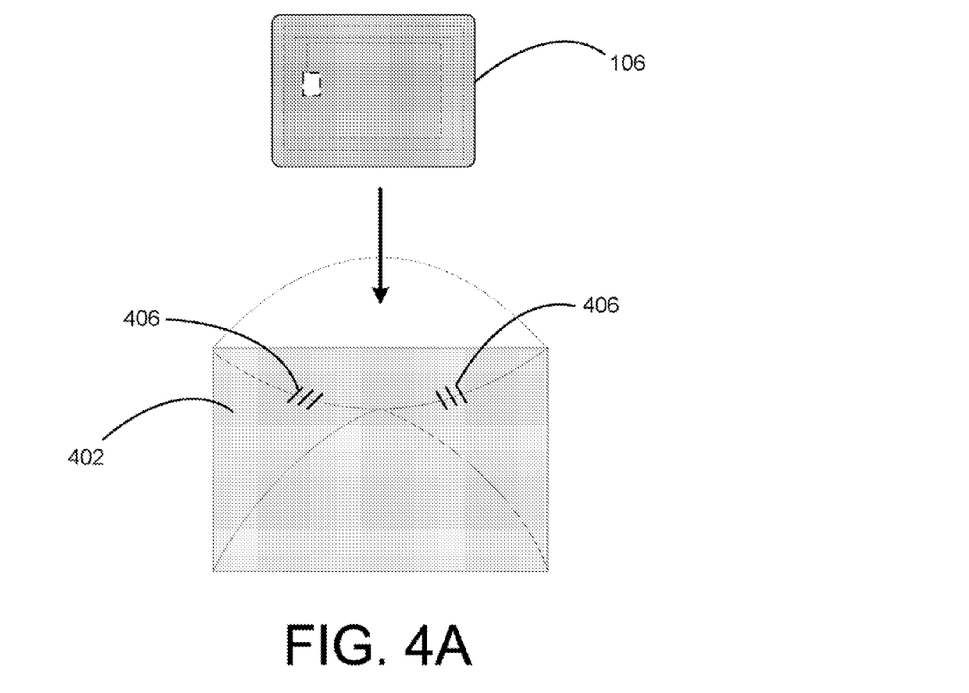
FIG. 4A and FIG. 4B illustrate packages for an RFID device incorporating an envelope in accordance with embodiments of the invention.
Figure 4B:
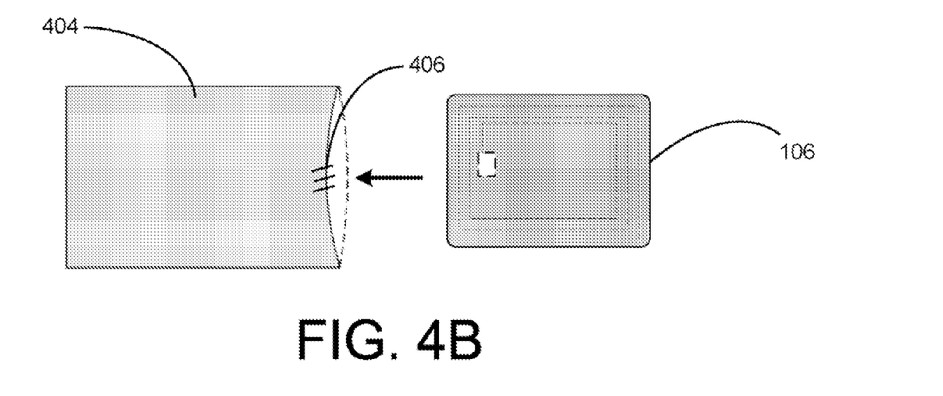

FIG. 4A and FIG. 4B illustrate packages for an RFID device incorporating an envelope in accordance with embodiments of the invention. As shown in FIGS. 4A and 4B envelopes 402 or 404 (or sleeves) may be used to enclose the RFID device 106. In an embodiment of the invention the envelopes 402 or 404 may be made of a plastic film material. In the embodiments shown in FIGS. 4A and 4B the envelopes 402 or 404 may be incorporated with a radio frequency shielding material operable to provide RF shielding for the RFID device 106, such as, for example, a ferrous material. In an embodiment of the invention, the radio frequency shielding material is in sufficient quantity so to provide shielding for the RFID device from being "sniffed" by an external device while the RFID device is encased in the envelope. In an embodiment of the invention, the envelopes 402 or 404 can be sealed activating full radio frequency shielding protection for the RFID device. Other radio frequency shielding materials including electromagnetic shielding materials such as, for example, those materials containing copper, nickel, etc. may be used to provide radio frequency shielding for the RFID device in alternative embodiments of the invention. The size, thickness, quantity, and form of the radio frequency shielding material may be tailored to the amount of radio frequency shielding that is sufficient to protect the RFID devices 106 from "sniffer" devices while in the package.

In embodiments of the invention, the radio frequency shielding material may be sprayed, coated, deposited, and/or embedded into the material that makes up the envelopes 402 or 404, or the radio frequency shielding material may be an iron oxide coating that substantially covers the outside of the envelopes 402 or 404. In some embodiments of the invention, the envelopes 402 or 404 may be sprayed, coated, deposited, and/or embedded with radio frequency shielding material in sufficient quantity to provide RF shielding while also being transparent or translucent enough to allow the encased RFID device 106 to be at least partially visible through the envelope 402 or 404.

In some embodiments of the invention, the envelopes 402 or 404 also incorporate a tamper indicator 406. In one embodiment of the invention, the envelopes 402 or 404 may be made by tamper evident plastic film. Other tamper evident technology appreciable by one of ordinary skill in the art may also be used. Other tamper indicators 406 that may be used in alternative embodiments of the invention, may include (1) an adhesive that diminishes its adhesive properties if separated and exposed to air or light thereby only allowing for one-time-use, (2) an adhesive or other connection means that are strong enough to require destruction of at least a portion of the envelope to open, (3) an indicator, adhesive, or other materials that change the color of at least a portion of the envelope when the seal has been compromised, or (4) fibers that may be embedded in the envelope in a pattern before attaching with adhesive such that attempts to open and re-close the envelope are visible because the strand orientation is disoriented.

Other embodiments of the invention may incorporate tamper indicating technology at the point where the envelope 402 or 404 is sealed. For example, the envelopes 402 and 404 may be sealed using an adhesive that is only good for one use diminishing its adhesiveness if separated and exposed to air or light, and therefore, once separated the adhesive cannot be used to remake the seal. Alternatively, a break in the seal may cause a change in color to a portion of the envelope or seal once the connection is broken, or breaking the seal requires destruction of at least a portion of the envelope 402 or 404. Other means for tamper evident technology appreciable by one of ordinary skill in the art may also be incorporated into the use of the envelopes 402 or 404.

In some embodiment of the invention, the envelopes 402 or 404 may be inserted into a display package or attached to a package with an adhesive or other attaching means. Additionally, in some embodiments of the invention (not shown in FIG. 4A or 4B), one or more tabs may be provided at the seal of the envelope to make it easy for a customer to open the envelope through manipulation (e.g., pulling, pushing, squeezing, tearing, etc.) of the tab(s) while simultaneously activating the tamper evident features making it obvious seal has been disturbed, once they have purchased and/or activated the RFID device.

Figure 5:
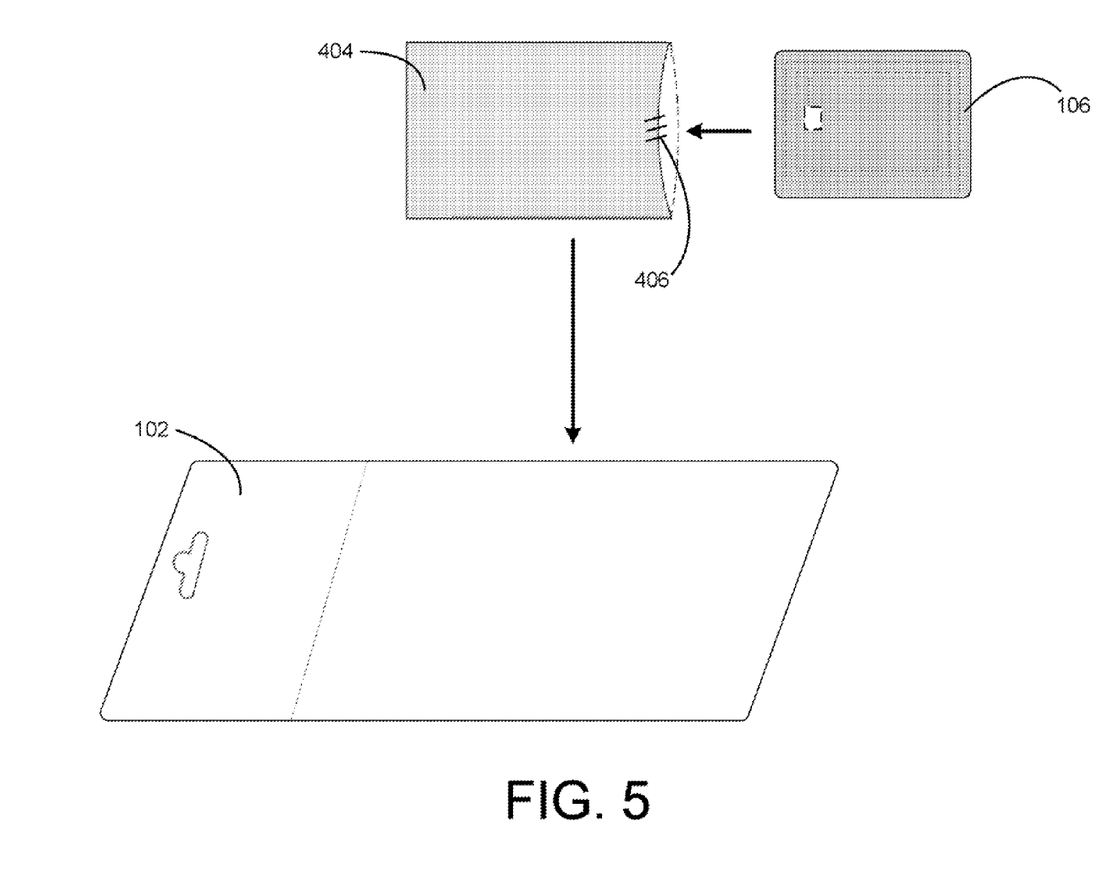
FIG. 5 illustrates an exploded view of a display package for an RFID device incorporating an envelope in accordance with one embodiment of the invention.

FIG. 5 illustrates an exploded view of a package for an RFID device incorporating an envelope in accordance with one embodiment of the invention. As shown in FIG. 5, the RFID device 106 is placed and sealed inside an envelope 402, and the envelope 402 is connected to the lower layer 102. Tamper indicators 406 described with reference to FIG. 4 as well as other tamper evident technology appreciable by one of ordinary skill in the art may be utilized in the configuration shown in FIG. 5.

Figure 6:
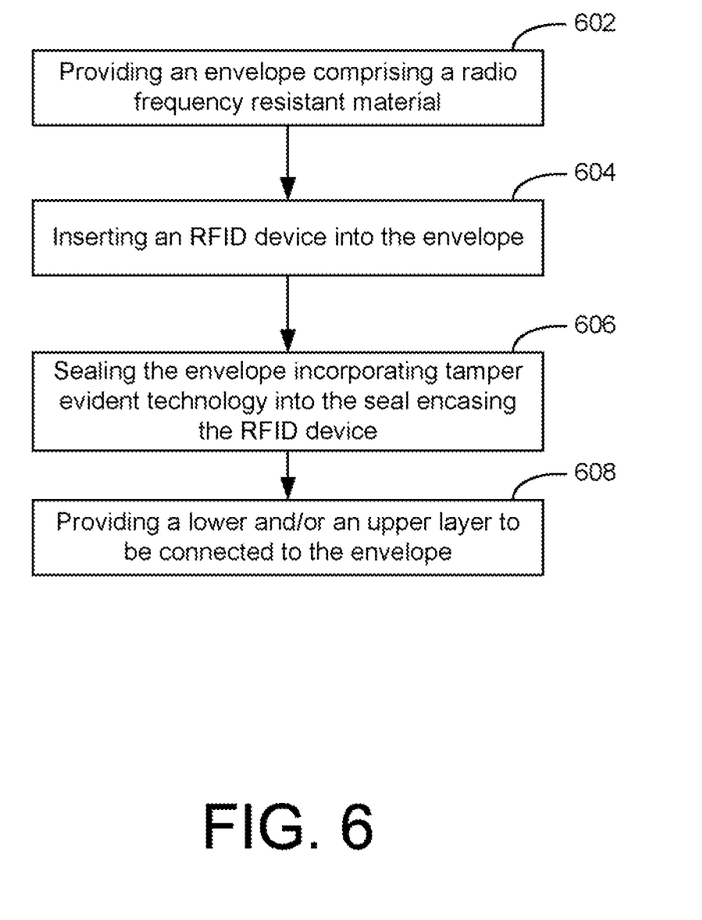
FIG. 6 illustrates a flowchart of a method for making a display package for an RFID device incorporating an envelope in accordance with one embodiment of the invention.

FIG. 6 illustrates a flowchart of a method for making a package for an RFID device incorporating an envelope in accordance with one embodiment of the invention. The process of making the display package for an RFID device begins with block 602 by providing an envelope. In embodiments of the invention the envelope may incorporate a radio frequency shielding material, such as, for example, a ferrous material, in such quantities so as to provide RF shielding for the RFID device. Next, block 604 is invoked where an RFID device is placed inside the envelope. Once the RFID device has been placed inside the envelope, block 606 is invoked where the envelope is sealed encasing the RFID device. In embodiments of the invention the seal incorporates tamper evident technology. The tamper evident technology may include (1) an adhesive that diminishes its adhesive properties if separated and exposed to air or light thereby only allowing for one-time-use, (2) an adhesive or other connection means that are strong enough to require destruction of at least a portion of the envelope to open, (3) an indicator, adhesive, or other materials that change the color of at least a portion of the envelope when the seal has been compromised, or (4) fibers that may be embedded in the envelope in a pattern before attaching with adhesive such that attempts to open and re-close the envelope are visible because the strand orientation is disoriented. Other tamper evident technology appreciable by one of ordinary skill in the art may also be used.

Finally, block 608 is invoked where a lower layer and/or upper layer is provided. In embodiments of the invention, the lower layer and/or upper layer may be a sheet of cardboard, plastic or another material appreciable by one of ordinary skill in the art. In alternative embodiments of the invention, the lower layer and/or upper layer itself may incorporate a radio frequency shielding material in such quantities so as to provide RF shielding for the RFID device.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

The invention claimed is:

1. A package for a radio frequency identification (RFID) device comprising:
an upper layer incorporating a radio frequency shielding material, wherein the upper layer covers upper and side portions of a radio frequency identification device and comprises a two-layer film, wherein a first layer of the two-layer film comprises the radio frequency shielding material and a second layer of the two-layer film comprises a single use tamper indicator, and wherein the first layer and the second layer of the two-layer film are bonded together; and
a lower layer covering a lower portion of the radio frequency identification device, wherein the lower layer is connected to the upper layer with the single use tamper indicator.

2. The package of claim 1, wherein at least a portion of the RFID device is visible through the upper layer of the package.

3. The package of claim 1, wherein the radio frequency shielding material comprises an iron oxide coating.

4. The package of claim 1, wherein the radio frequency shielding material is embedded into the upper layer operable to provide RF shielding.

5. The package of claim 1, further comprising at least one tab connected to at least the upper layer, wherein manipulation of the at least one tab activates the single use tamper indicator.

6. The package of claim 1, wherein the lower layer comprises an embedded radio frequency shielding material.

7. The package of claim 1, wherein the radio frequency shielding material comprises at least one of iron, copper, or nickel.

8. The package of claim 1, wherein the single use tamper indicator comprises a plastic film containing fiber strands that are misaligned when at least a portion of the single use tamper indicator is broken.

9. The package of claim 1, wherein the single use tamper indicator comprises an adhesive that changes color when the single use tamper indicator is broken.

10. The package of claim 1, wherein at least a portion of the upper layer or lower layer is damaged when a portion of the single use tamper indicator is broken.

11. The package of claim 1, wherein the single use tamper indicator comprises an adhesive that diminishes at least one adhesive property when the single use tamper indicator is broken.

12. A package for holding a radio frequency identification (RFID) device comprising:
a plastic film envelope, wherein the envelope comprises a two-layer film, wherein a first layer of the two-layer film comprises a radio frequency shielding material and a second layer of the two-layer film comprises a single use tamper indicator, wherein the first layer and the second layer of the two-layer film are bonded together, and wherein the envelope can be sealed to encase a RFID device when the RFID device is inserted within the envelope; and
the single use tamper indicator incorporated into a seal of the envelope, wherein the single use tamper indicator is activated when the seal is at least partially broken.

13. The package of claim 12, further comprising at least one tab connected to at least the envelope, wherein manipulation of the at least one tab activates the single use tamper indicator.

14. The package of claim 12, wherein the radio frequency shielding material is embedded into the envelope operable to provide RF shielding.

15. The package of claim 12, wherein the single use tamper indicator comprises a plastic film containing fiber strands that are misaligned when the at least a portion of the seal is broken.

16. The package of claim 12, further comprising:
an upper layer;
a lower layer, wherein the lower layer is connected to the upper layer, and wherein the plastic film envelope is encased by the upper layer and lower layer.

17. The package of claim 16, wherein the envelope is connected to the lower layer or upper layer by an adhesive.

18. The package of claim 12, wherein the single use tamper indicator comprises an adhesive that changes color when at least a portion of the seal of the envelope is broken.

19. The package of claim 12, wherein at least a portion of the RFID device is visible through the envelope and the upper layer of the package.

20. A method of manufacturing packaging for a radio frequency identification (RFID) device comprising:
providing an upper layer comprising a radio frequency shielding material, wherein the upper layer covers upper and side portions of a RFID device, wherein the upper layer comprises a two-layer film, wherein a first layer of the two-layer film comprises the radio frequency shielding material and a second layer of the two-layer film comprises a single use tamper indicator, and wherein the first layer and the second layer of the two-layer film are bonded together; and
providing a lower layer covering the lower portion of the RFID device, wherein the lower layer is connected to the upper layer with the single use tamper indicator.

21. The method of claim 20, wherein the radio frequency shielding material is embedded into the upper layer operable to provide RF shielding.

22. An article comprising:
a radio frequency identification (RFID) device; and
a package for the RFID device, wherein the package comprises an upper layer comprises a two-layer film, wherein a first layer of the two-layer film comprises a radio frequency shielding material covering the upper and side portions of the RFID device and a second layer of the two-layer film comprises a single use tamper indicator, and a lower layer covering a lower portion of the RFID device, wherein the lower layer is connected to the upper layer with the single use tamper indicator.

* * * * *